United States Patent
Kitamura et al.

(10) Patent No.: US 12,528,885 B2
(45) Date of Patent: Jan. 20, 2026

(54) METHOD FOR PRODUCING HYDROXYALKYL ALKYL CELLULOSE

(71) Applicant: Shin-Etsu Chemical Co., Ltd., Tokyo (JP)

(72) Inventors: Akira Kitamura, Joetsu (JP); Mitsuo Narita, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 445 days.

(21) Appl. No.: 18/190,171

(22) Filed: Mar. 27, 2023

(65) Prior Publication Data
US 2023/0312761 A1 Oct. 5, 2023

(30) Foreign Application Priority Data
Mar. 29, 2022 (JP) ................. 2022-054665

(51) Int. Cl.
C08B 11/08 (2006.01)
C08B 1/08 (2006.01)
C08K 3/22 (2006.01)

(52) U.S. Cl.
CPC ............ C08B 11/08 (2013.01); C08B 1/08 (2013.01); C08K 3/22 (2013.01)

(58) Field of Classification Search
None
See application file for complete search history.

(56) References Cited

U.S. PATENT DOCUMENTS

| | | | |
|---|---|---|---|
| 10,723,807 B2 * | 7/2020 | Kitamura | C08B 11/193 |
| 2009/0165971 A1 | 7/2009 | Narita | |
| 2018/0282436 A1 * | 10/2018 | Kitamura | C08B 11/02 |

FOREIGN PATENT DOCUMENTS

| | | | |
|---|---|---|---|
| EP | 2075259 A1 * | 7/2009 | ............ C08B 11/00 |
| JP | 2009155534 A | 7/2009 | |
| JP | 2014503004 A | 2/2014 | |
| WO | 2012051034 A1 | 4/2012 | |

OTHER PUBLICATIONS

Anderson et al. "The Evaluation of Pulp Requirements for Continuous Alkali Steeping in the Manufacture of Cellulose Ethers" Journal of the Technical Association of the Pulp and Paper Industry, 39(8):548-553 (1956).
Extended European Search Report corresponding to European Patent Application No. 23164692.8 (9 pages) (dated Jul. 25, 2023).

* cited by examiner

*Primary Examiner* — Traviss C Mcintosh, III
(74) *Attorney, Agent, or Firm* — Myers Bigel, P.A.

(57) ABSTRACT

There is provided a method for producing a hydroxyalkyl alkyl cellulose having a high storage modulus (thermal gel strength) and a small number of undissolved fibers. More specifically, there is provided a method for producing a hydroxyalkyl alkyl cellulose including steps of: bringing sheet-shaped pulp having a pore volume of 0.55 ml/g or more and less than 1.00 ml/g or chip-shaped pulp obtained by cutting the sheet-shaped pulp into contact with a first alkali metal hydroxide solution to obtain an alkali cellulose mixture, removing a liquid from the alkali cellulose mixture to obtain alkali cellulose, reacting the alkali cellulose with an alkylating agent and a hydroxyalkylating agent to obtain a first reaction mixture, mixing the first reaction mixture with a second alkali metal hydroxide solution to obtain a second reaction mixture, and purifying the second reaction mixture to obtain a hydroxyalkyl alkyl cellulose.

19 Claims, No Drawings

METHOD FOR PRODUCING HYDROXYALKYL ALKYL CELLULOSE

BACKGROUND OF THE INVENTION

1. Field of the Invention

The invention relates to a method for producing a hydroxyalkyl alkyl cellulose.

2. Related Art

Honeycomb-shaped ceramic extrudates are used as carriers for exhaust gas cleaning catalysts, filters and heat exchangers in the automotive and various industries. The ceramic extrudates may be produced, for example, by the method in which a ceramic main material is mixed, calcinated and pulverized to form non-plastic ceramic powder; the powder is subjected to addition of a binder, water, an optional plasticizer, and an optional lubricant so as to allow the powder to have plasticity, and kneaded by using a roll mill, a continuous kneader or the like to obtain a kneaded material; and the kneaded material is molded, and then sintered to obtain a body.

Known examples of the binder include a cellulose derivative, in particular methyl cellulose and hydroxypropyl methyl cellulose. They form strong gels at high temperature so that the shape-retaining property of the kneaded material is improved, and the extrusion into the thin-walled honeycomb structure becomes easy.

Among them, hydroxypropyl methyl cellulose has a higher thermal gelation temperature than methyl cellulose so that the hydroxypropyl methyl cellulose can be applied to a higher extrusion temperature, thereby making it advantageous.

As a method for producing the hydroxypropyl methyl cellulose having high thermal gel strength, there have been proposed the method in which an alkalization step of cellulose pulp with an alkali metal hydroxide solution and/or an etherification reaction step is divided into a plurality of steps.

For example, there is a method in which a cellulose pulp is alkalized with a first-stage alkali metal hydroxide solution, then subjected to addition of an alkylating agent and a hydroxypropoxylating agent for an etherification reaction, and then subjected to slow addition of a second-stage alkali metal hydroxide solution to continue the etherification reaction, thereby obtaining hydroxypropyl methylcellulose (JP2014-503004A, which is a Japanese phase application of WO2012/051034A1).

On the other hand, sheet-shaped pulp having a pore volume of less than 1.00 ml/g has been avoided as a starting material for etherification because it is difficult to produce a cellulose ether having a small amount of undissolved fibers (JP2009-155534A).

SUMMARY OF THE INVENTION

The hydroxypropyl methyl cellulose produced by the production method described in JP 2014-503004A provides a high thermal gel strength, but has many undissolved fibers. When hydroxypropyl methyl cellulose having such a large number of undissolved fibers is used, pores of several micrometers are formed in the molded body after the ceramic sintering. Consequently, the strength of the ceramic sintered body is lowered. Further, the pores also deteriorate the withstand voltage characteristics of the ceramic sintered body for the use of an electrostatic body such as a capacitor.

The invention has been made in view of the above circumstances. An object of the invention is to provide a hydroxyalkyl alkyl cellulose having a high storage modulus (thermal gel strength) and a low number of undissolved fibers, and a method for producing the same.

As a result of intensive studies to achieve the above object, the inventors have found that a hydroxyalkyl alkyl cellulose having a high storage modulus G'(80° C.) and a low number of undissolved fibers can be produced by dividedly mixing with an alkali metal hydroxide two or more times and using sheet-shaped or chip-shaped pulp having a specific pore volume which has been conventionally avoided as a raw material, and thus have completed the invention.

In one aspect of the invention, there is provided a method for producing a hydroxyalkyl alkyl cellulose, the method comprising steps of: bringing sheep-shaped pulp having a pore volume of 0.55 ml/g or more and less than 1.00 ml/g or chip-shaped pulp obtained by cutting the sheet-shaped pulp into contact with a first alkali metal hydroxide solution to obtain an alkali cellulose mixture;

removing a liquid from the alkali cellulose mixture to obtain alkali cellulose;

reacting the alkali cellulose with an alkylating agent and a hydroxyalkylating agent to obtain a first reaction mixture;

mixing the first reaction mixture with a second alkali metal hydroxide solution to obtain a second reaction mixture; and purifying the second reaction mixture to obtain a hydroxyalkyl alkyl cellulose.

According to the invention, a hydroxyalkyl alkyl cellulose having a high storage modulus G'(80° C.) and a low number of undissolved fibers can be produced.

DETAILED DESCRIPTION OF THE PREFERRED EMBODIMENTS

The invention will be described in detail below.

Examples of the raw material of the sheet-shaped pulp include wood pulp and cotton linter pulp. The wood pulp is particularly preferable from the viewpoint of reducing the number of undissolved fibers. As the tree species of the wood, coniferous trees such as pine, spruce and tsuga; and hardwood (broad-leaved) trees such as eucalyptus and maple may be used. The pine is preferable from the viewpoint of producing a hydroxyalkyl alkyl cellulose having a small number of undissolved fibers.

The sheet-shaped pulp may be classified into kraft pulp obtained by digesting wood with a chemical solution containing sodium hydroxide and sodium sulfide as main components, and sulfite pulp obtained by digesting wood with an acidic sulfite solution. Both of the kraft pulp and the sulfite pulp may be used. The kraft pulp is preferable from the viewpoint of producing a hydroxyalkyl alkyl cellulose having a small number of undissolved fibers.

The sheet-shaped pulp has a pore volume of 0.55 ml/g or more and less than 1.00 ml/g, preferably from 0.65 to 1.00 ml/g, and more preferably from 0.65 to 0.95 ml/g. When the pore volume is smaller than 0.55 ml/g, it becomes difficult to produce a hydroxyalkyl alkyl cellulose having a small number of undissolved fibers. When the pore volume is 1.0 ml/g or more, it becomes difficult to produce a hydroxyalkyl alkyl cellulose having a higher storage modulus G'(80° C.). It is surprising that a hydroxyalkyl alkyl cellulose having a small amount of undissolved fibers may be produced by using sheet-shaped pulp having a pore volume of less than 1.00 ml/g, the use of which has conventionally been avoided due to difficulty in production of a cellulose ether having a small number of undissolved fibers.

The pore volume of the sheet-shaped pulp is the sum of the volumes of the fine voids per unit mass of dry sheet-shaped pulp measured by mercury intrusion. The method for measuring the pore volume of the sheet-shaped pulp comprises steps of: drying a sample at 105° C. for 2 hours under atmospheric pressure; cutting the dried sample into about 1.2 cm×about 2.4 cm strips wherein the thickness of the strips may be the same as the thickness of the sheet-shaped pulp because the eventual conversion into unit mass is possible even if the thickness changes; arranging three of the strips in the form of triangle in a cell (e.g., a cell attached to 9520 type of Shimadzu Autopore) so as not to form an overlap region during mercury intrusion; and measuring the pore volume with a porosimeter (e.g., 9520 type of Shimadzu Autopore) at a mercury pressure of from 5.5 kPa (equivalent to about 220 μm pore diameter) to 411 MPa (equivalent to about 0.003 μm pore diameter).

The thickness of the sheet-shaped pulp is preferably from 0.1 to 5.0 mm, and more preferably from 0.5 to 2.0 mm, from the viewpoint of handling during the step of removing liquid.

The density of the sheet-shaped pulp is preferably 0.80 g/ml or less, and more preferably from 0.55 to 0.80 g/ml, from the viewpoint of productivity, reduction of the compositional variance of the alkali cellulose, and reduction of the number of undissolved fibers. The density is measured in accordance with the method in JIS (Japanese Industrial Standards) P8215.

The alpha cellulose content of the sheet-shaped pulp is preferably 90% by mass or more from the viewpoint of suppressing a decrease in yield in the purification step. The alpha cellulose content may be determined by the method described in TEST METHOD T429 of Japan TAPPI (Japan Technical Association of the Pulp and Paper Industry).

The intrinsic viscosity, which is an indicator of the degree of polymerization of pulp, is preferably less than 15.0 dl/g, more preferably less than 14.0 dl/g, from the viewpoint of producing a hydroxyalkyl alkyl cellulose having a small number of undissolved fibers. The lower limit of the intrinsic viscosity is preferably 3.0 dl/g. The intrinsic viscosity may be determined in accordance with the viscosity measurement method in JIS P8215.

The sheet-shaped pulp may be used as it is. In addition, the sheet-shaped pulp may be used in form of chips after cutting the sheet-shaped pulp into the chips.

The chip-shaped pulp is preferably a chip-shaped pulp obtained by cutting a sheet-shaped pulp having a thickness of from 0.1 to 5.0 mm. A method for producing the chip-shaped pulp is not limited. In addition to a slitter cutter, an existing cutting device may be used. The cutting device is preferably a cutter capable of continuous cutting from the viewpoint of advantageous investment cost.

One side of the chip is usually from 2 to 100 mm, more preferably from 3 to 50 mm, from the viewpoint of handling in the immersion operation and reducing the number of undissolved fibers.

Next, a step of bringing the sheet-shaped pulp or the chip-shaped pulp into contact with a first alkali metal hydroxide solution to obtain an alkali cellulose mixture and a step of removing a liquid from the obtained alkali cellulose mixture to obtain alkali cellulose will be described.

The alkali metal hydroxide solution is dividedly blended two or more times in order to obtain a hydroxyalkyl alkyl cellulose having a higher storage modulus G' and a small number of undissolved fibers. It is preferably blended in two or three stages, more preferably in two stages, from the viewpoint of reducing the complexity of the operation.

The type of the first alkali metal hydroxide solution to be used is not particularly limited as long as alkali cellulose is obtained. It is preferably an aqueous solution of sodium hydroxide or potassium hydroxide from the viewpoint of economy.

The concentration of the first alkali metal hydroxide solution is preferably from 23 to 60% by mass, more preferably from 35 to 55% by mass. The solution of the first alkali metal hydroxide is preferably an aqueous solution. However, it may be an alcohol solution such as an ethanol solution, or a mixed solution of a water-soluble alcohol and water.

Examples of a method of bringing sheet-shaped pulp into contact with a first alkali metal hydroxide solution includes immersing the sheet-shape pulp in the alkali metal hydroxide solution. As for the chip-shaped pulp, for example, there may be provided a method of adding a necessary amount of an alkali hydroxide solution to the chip-shaped pulp.

The temperature at which the sheet-shaped or chip-shaped pulp is brought into contact with the first alkali metal hydroxide solution is preferably from 10 to 70° C., more preferably from 15 to 60° C., from the viewpoint of suppressing the solidification of the first alkali metal hydroxide solution and suppressing the composition variance of the alkali cellulose.

The period of time for which the sheet-shaped or chip-shaped pulp is brought into contact with the excess first alkali metal hydroxide solution is preferably from 10 to 600 seconds, more preferably from 15 to 120 seconds, from the viewpoint of obtaining alkali cellulose having a desired composition, suppressing the composition variance of the alkali cellulose, and the operation surface during the contact.

The mass ratio of first alkali metal hydroxide in the first alkali metal hydroxide solution to the solid component in the starting pulp (first alkali metal hydroxide/solid component in the pulp) in the step of bringing the sheet-shape pulp or the chip-shaped pulp into contact with the first alkali metal hydroxide solution is preferably from 1.5 to 2500, more preferably from 5 to 100, and still more preferably from 10 to 30, from the viewpoint of reducing the scale of the equipment and the number of undissolved fibers.

The solid component in the pulp means a component or components other than water in the pulp. The mass of the solid component in the pulp may be calculated from the dry matter content determined in accordance with JIS P8203: 1998: Pulp-Determination of dry matter content. The dry matter content is obtained as the ratio of the mass of the sample having been dried at 105±2° C. and having reached constant mass to the mass of the sample before drying, and is expressed as mass % or % by mass. The solid component in the pulp contains, in addition to the cellulose as a main component, very small amounts of low-polymerization-degree cellulose, hemicellulose, lignin, organic materials such as resin components, and inorganic materials such as Si components and Fe components. Since the content of low-polymerization-degree cellulose in the commercial pulp obtained by digesting and bleaching wood is a very small, a cellulose content may be substantially the same as the alpha cellulose content with respect to the solid component in the pulp.

The ratio of the moles of the first alkali metal hydroxide in the first alkali metal hydroxide solution to the moles of the solid content in the starting pulp (the moles of the first alkali metal hydroxide/the moles of the solid content in the pulp) is preferably from 2.43 to 3.65 mol/mol, more preferably from 2.83 to 3.44 mol/mol, and still more preferably from 2.91 to 3.24 mol/mol, from the viewpoint of achieving both a high storage modulus G' (80° C.) and reduction in the number of undissolved fibers, where the moles of the solid content in the starting pulp is calculated by regarding the molecular weight of anhydroglucose unit (AGU) as 1 mole. The amount of the first alkali metal hydroxide solution to be used in the contacting step is selected so as to fall within the above range. The mass of the first alkali metal hydroxide may be obtained by calculation based on neutralization titration.

The ratio of the mass of the first alkali metal hydroxide to the total mass of the first alkali metal hydroxide and the second alkali metal hydroxide in the second alkali metal hydroxide solution described below (the mass ratio of first alkali metal hydroxide/total alkali metal hydroxides) is preferably from 0.6 to 0.8, and more preferably from 0.62 to 0.78. When the ratio of the mass of the first alkali metal hydroxide to the total mass of the first and second alkali metal hydroxides is less than 0.6, a hydroxyalkyl alkyl cellulose having a small number of undissolved fibers may not be produced. When the ratio of the mass of the first alkali metal hydroxide to the total mass of the first and second alkali metal hydroxides is more than 0.8, a hydroxyalkyl alkyl cellulose having a high storage modulus G'(80° C.) that provides high thermal gel strength may not be produced.

The alkali cellulose is obtained by bringing the sheet-shaped or chip-shaped pulp into contact with an excess first alkali metal hydroxide solution to obtain an alkali cellulose mixture, and then removing a liquid from the resulting alkali cellulose mixture so as to remove the excess or remainder of the first alkali metal hydroxide solution.

Examples of the liquid-removal method include a method comprising a step of pressing the immersed pulp with a roller or the other device after immersing the sheet-shaped pulp in a bath containing a first alkali metal hydroxide solution, and a method comprising a step of pressing the immersed pulp by centrifugation or the other mechanical method after immersing the chip-shape pulp in a bath containing a first alkali metal hydroxide solution.

Next, a step of reacting the obtained alkali cellulose with an alkylating agent and a hydroxyalkylating agent to obtain a first reaction mixture will be described.

The obtained alkali cellulose may be fed into the reactor as it is or after optional cutting. The reactor is preferably a reactor capable of allowing the alkali cellulose to react with an alkylating agent and a hydroxyalkylating agent, while loosening pulp-derived fibers of the alkali cellulose by mechanical force, from the viewpoint of reducing the number of undissolved fibers. For this reason, a reactor having an internally stirring mechanism is preferable. Examples of such a reactor include a plough-type shovel blade mixer. It is also possible to disintegrate the alkali cellulose in another apparatus having an internally stirring mechanism before it is fed into the reactor. After feeding the alkali cellulose into the reactor, oxygen in the reactor is preferably removed with a vacuum pump or the like and replaced with an inert gas, preferably nitrogen. In addition, the reactor is preferably equipped with a temperature-measuring device capable of measuring the inside temperature of the reactor.

An organic solvent which does not participate in the etherification reaction, for example, dimethyl ether, may be added into the system after the addition of the alkali cellulose, for the purpose of suppressing the localized heat generation in the reactor, Examples of the alkylating agent include a methylating agent such as methyl chloride, dimethyl sulfate and methyl iodide. The methyl chloride is preferable from the viewpoint of obtaining a hydroxyalkyl alkyl cellulose having a high storage modulus G'(80° C.) and from the economical viewpoint.

Examples of the hydroxyalkylating agent include ethylene oxide, propylene oxide and butylene oxide. The propylene oxide is preferable from the viewpoint of obtaining a hydroxyalkyl alkyl cellulose having a high storage modulus G'(80° C.) and from the economical viewpoint.

When the alkali cellulose is reacted with the alkylating agent and the hydroxyalkylating agent, the inside temperature of the reactor is preferably from 40 to 90° C., and more preferably from 50 to 80° C., from the viewpoint of reaction control.

Regarding the molar amount of the alkylating agent to be blended, the ratio of the molar number of the alkylating agent to the molar number of the solid component in the starting pulp (molar number of the alkylating agent/molar number of the solid component in the pulp) is preferably from 2.43 to 9.30 mol/mol, and more preferably from 3.04 to 7.89 mol/mol, from the viewpoint of achieving both high thermal gel strength and reduction in the number of undissolved fibers and from the economical viewpoint, where the molecular weight of the anhydroglucose unit (AGU) is regarded as 1 mol with respect to the solid component in the pulp.

The ratio of the moles of the hydroxyalkylating agent to the moles of the solid component in the starting pulp is preferably from 0.53 to 2.51 mol/mol, and more preferably from 0.55 to 2.09 mol/mol, from the viewpoint of achieving both high thermal gel strength and a small number of undissolved fibers, where the molecular weight of the anhydroglucose unit (AGU) is regarded as 1 mol with respect to the solid component in the pulp.

The blending of the alkali cellulose with the alkylating agent and the hydroxyalkylating agent is preferably addition of the alkylating agent and the hydroxyalkylating agent to the alkaline cellulose. The order of addition of the alkylating agent and the hydroxyalkylating agent is not limited. The addition of the alkylating agent may start before, during, or after the addition of the hydroxyalkylating agent. The addition of the alkylating agent may start preferably before or during the addition of the hydroxyalkylating agent from the viewpoint of productivity.

The addition time of the alkylating agent is preferably from 30 to 120 minutes, more preferably 40 to 90 minutes, from the viewpoint of reaction control and productivity.

The addition time of the hydroxyalkylating agent is preferably from 5 to 30 minutes, more preferably from 10 to 30 minutes, from the viewpoint of reaction control and productivity.

The degree of substitution (DS) of the alkoxy groups of the hydroxyalkyl alkyl cellulose in the first reaction mixture is preferably from 0.75 to 1.68, more preferably from 0.81 to 1.68, and still more preferably from 0.99 to 1.37, from the viewpoint of obtaining the desired thermal gel strength. The molar substitution (MS) of hydroxyalkoxy groups is preferably from 0.03 to 0.28, more preferably from 0.05 to 0.25, from the viewpoint of obtaining the desired thermal gel strength and thermal gelation temperature.

The degree of substitution (DS) is the average number of alkoxy groups per anhydroglucose unit and the molar substitution (MS) is the average number of moles of hydroxyalkoxy groups per anhydroglucose unit. The DS and MS of hydroxyalkyl alkyl cellulose may be determined by converting the value measured in accordance with the assay of hypromellose in the Japanese Pharmacopeia Seventeenth Edition.

Next, a step of mixing the obtained first reaction mixture with a second alkali metal hydroxide solution for continuing the reaction to obtain a second reaction mixture will be described.

The type of the second alkali metal hydroxide solution is not particularly limited, and examples thereof include a sodium hydroxide solution and a potassium hydroxide solution. The second alkali metal hydroxide solution is preferably an aqueous sodium hydroxide solution from the economical viewpoint. The first alkali metal hydroxide in the first alkali metal hydroxide solution and the second alkali metal hydroxide in the second alkali metal hydroxide solution may be of the same or different types. They are preferably of the same types from the viewpoint of operability.

The blending of the first reaction mixture with the second alkali metal hydroxide solution is preferably the addition of the second alkali metal hydroxide solution to the first reaction mixture. For example, the second alkali metal hydroxide solution is directly dropwise added to or sprayed to the first reaction mixture. It is preferable to spray the second alkali metal hydroxide solution to the first reaction mixture from the viewpoint of uniform distribution of the second alkali metal hydroxide into the first reaction mixture.

A concentration of the second alkali metal hydroxide solution is preferably from 10 to 60% by mass, more preferably from 30 to 50% by mass, from the viewpoint of the efficiency of etherification reaction and handling. The concentrations of the first alkali metal hydroxide solution and the second alkali metal hydroxide solution are preferably the same, but may be different.

The timing of blending the first reaction mixture with the second alkali metal hydroxide solution, in other words, the start time of blending the first reaction mixture with the second alkali metal hydroxide solution is preferably the time when the addition of 80% by mass or more of the total amount of the alkylating agent to be blended is completed and the addition of the hydroxyalkylating agent to be blended is completed, and more preferably the time when the additions of the alkylating agent and the hydroxyalkylating agent to be blended are completed. When the addition start of the second alkali metal hydroxide solution is is before the addition of 80% by mass or more of the total amount of the alkylating agent to be blended is completed, a hydroxyalkyl alkyl cellulose having a high storage modulus G'(80° C.) may not be produced.

Regarding the blending amount of the second alkali metal hydroxide in the second alkali metal hydroxide solution, the moles of the second alkali metal hydroxide to the moles of the solid component in the starting pulp (mole ratio of second alkali metal hydroxide/solid component in pulp) is preferably from 0.70 to 2.50, more preferably from 0.80 to 1.9, from the viewpoint of achieving both a high storage modulus G'(80° C.) and a small number of undissolved fibers, where the molecular weight of anhydroglucose unit is regarded as 1 mole with respect to the solid component in the starting pulp.

The inside temperature of the reactor at the start of addition of the second alkali metal hydroxide solution to the first reaction mixture, that is, the temperature of the first reaction mixture at the start of addition of the second alkali metal hydroxide solution to the first reaction mixture, is preferably from 65 to 90° C., more preferably from 70 to 85° C., and still more preferably from 75 to 85° C., from the viewpoint of production of a hydroxyalkyl alkyl cellulose having a high storage modulus G'(80° C.) and reaction control.

The inside temperature of the reactor at the time when the addition of the second alkali metal hydroxide solution is completed (i.e., the temperature of the mixture of the first reaction mixture and the second alkali metal hydroxide solution) is preferably from 80 to 100° C., and more preferably from 85 to 95° C., from the viewpoint of obtaining a hydroxyalkyl alkyl cellulose having high thermal gel strength. The temperature at the start of addition of the second alkali metal hydroxide solution to the first reaction mixture is preferably selected to be lower than the temperature at the end of addition of the second alkali metal hydroxide solution from the viewpoint of increasing the inside temperature of the reactor preferably at a constant rate. The temperature difference between the start and the end of the addition is preferably from 3 to 20° C., more preferably from 4 to 15° C.

Regarding the addition rate of the second alkali metal hydroxide in the second alkali metal hydroxide solution, the ratio of the moles of the second alkali metal hydroxide to be added per unit time to the moles of solid component in the starting pulp is preferably from 2.76 to 7.50 mol/mol·hr, more preferably from 2.76 to 5.00 mol/mol·hr, and still more preferably from 2.76 to 4.50 mol/mol·hr, where the molecular weight of the anhydroglucose unit (AGU) is regarded as 1 mole with respect to the solid component in the pulp. When the addition rate of the second alkali metal hydroxide is less than 2.76 mol/mol·hr, a hydroxyalkyl alkyl cellulose having both high thermal gel strength and the reduced number of undissolved fibers may not be produced. When the addition rate of the second alkali metal hydroxide is more than 7.50 mol/mol·hr, a hydroxyalkyl alkyl cellulose having high thermal gel strength may not be produced.

After blending the first reaction mixture with the second alkali metal hydroxide solution, stirring for mixing is preferably carried out.

When the second alkali metal hydroxide solution is added to the first reaction mixture, it is preferable to increase the inside temperature of the reactor at a constant rate during the period from the start to the end of the addition of the second alkali metal hydroxide solution from the viewpoint of obtaining a hydroxyalkyl alkyl cellulose having high gel strength. The temperature increase rate is preferably from 10.0 to 30.0° C./hr, more preferably from 15.0 to 30.0° C./hr.

In general, the alkali cellulose obtained by mixing cellulose pulp with an alkali metal hydroxide solution is converted into a hydroxyalkyl alkyl cellulose through the etherification reaction with an alkylating agent and a hydroxyalkyl alkylating agent.

In this case, the alkylating and hydroxyalkylating agents in the reaction system are gradually consumed as the etherification reaction progresses. When the inside temperature of the reactor is constant, the etherification reaction rate gradually decreases as the consumption of the alkylating agent and the hydroxyalkylating agent progresses in the reaction system. Therefore, by blending the first reaction mixture with the second alkali metal hydroxide solution while increasing the inside temperature of the reactor at a constant rate, the decline in the etherification reaction rate due to the consumption of the alkylating agent and the hydroxyalkylating agent is suppressed, and the rate of the etherification reaction combined with blending of the second alkali metal hydroxide solution may be relatively increased. Consequently, a hydroxyalkyl alkyl cellulose having high thermal gel strength may be obtained.

In the method described above, the first reaction mixture is blended with the second alkali metal hydroxide solution, without further blending of an alkylating agent and a hydroxyalkylating agent, to obtain a second reaction mixture. It is particularly preferable not to divide each of the alkylating agent and the hydroxyalkylating agent for its bending at two or more times from the viewpoint of efficient reduction of the number of undissolved fibers. For this reason, the alkylating agent and the hydroxyalkylating agent are blended only in the first stage for the reaction with the first alkali metal hydroxide solution.

In addition to the method described above, it is also possible to divide the alkylating agent into a first alkylating agent and a second alkylating agent, and divide the hydroxyalkylating agent into a first hydroxyalkylating agent and a second hydroxyalkylating agent, and then the first alkylating agent and the first hydroxyalkylating agent are blended to obtain the first reaction mixture, while the second akylating agent and the second hydroxyalkylating agent are blended to obtain the second mixture.

Regarding the blending amount of the second alkylating agent to be blended with the first reaction mixture when the alkylating agent is divided for twice blending, the ratio of the moles of the second alkylating agent to the moles of the solid component in the starting pulp (mole ratio of second alkylating agent/solid component in pulp) is preferably from 0.05 to 3.72, more preferably from 0.05 to 2.50, from the viewpoint of both high thermal gel strength and reduction in the number of undissolved fibers as well as from the economical viewpoint, where the molecular weight of the anhydroglucose unit (AGU) is regarded as 1 mole with respect to the solid component in the starting pulp.

The ratio of the molar amount of the second alkylating agent to the total molar amount of the first alkylating agent and the second alkylating agent is preferably from 0.01 to 0.40, more preferably from 0.01 to 0.35, from the viewpoint of both high thermal gel strength and reduction in the number of undissolved fibers as well as from the economical viewpoint. When the alkylating agent is divided for twice blending, the blending amount of the first alkylating agent is preferably selected so as to allow the ratio of the molar amount of the second alkylating agent to the total molar amount of the first alkylating agent and the second alkylating agent to fall within the above range.

Regarding the blending amount of the second hydroxyalkylating agent to be blended with the first reaction mixture when the hydroxyalkylating agent is divided for twice blending, the ratio of the moles of the second hydroxyalkylating agent to the moles of the solid component in the starting pulp (mole ratio of second hydroxyalkylating agent/ solid component in pulp) is preferably from 0.05 to 1.00, more preferably from 0.05 to 0.80, from the viewpoint of both high thermal gel strength and reduction in the number of undissolved fibers as well as from the economic viewpoint, where the molecular weight of the anhydroglucose unit (AGU) is regarded as 1 mole.

The ratio of the molar amount of the second hydroxyalkylating agent to the total molar amount of the first and second hydroxyalkylating agents (mole ratio of the second hydroxyalkylating agent/total hydroxyalylating agents) is preferably from 0.01 to 0.40, and more preferably from 0.01 to 0.35, from the viewpoint of both high thermal gel strength and reduction in the number of undissolved fibers as well as from the economic viewpoint. When the hydroxyalkylating agent is divided for twice blending, the blending amount of the first hydroxyalkylating agent is preferably selected so as to allow the ratio of the molar amount of the second hydroxyalkylating agent to the total molar amount of the first hydroxyalkylating agent and the second hydroxyalkylating agent to fall within the above range.

The inside temperature of the reactor at the start of blending the second alkylating agent and/or the second hydroxyalkylating agent with the first reaction mixture, preferably the inside temperature of the reactor at the start of adding the second alkylating agent and/or the second hydroxyalkylating agent to the first reaction mixture, is preferably from 65 to 90° C., more preferably from 70 to 85° C., and still more preferably from 75 to 85° C.

The blending time for blending the second alkylating agent and/or the second hydroxyalkylating agent with the first reaction mixture, preferably the addition time for adding the second alkylating agent and/or the second hydroxyalkylating agent to the first reaction mixture is preferably from 3 to 60 minutes, more preferably from 5 to 40 minutes, from the viewpoint of productivity.

After blending the second alkali metal hydroxide solution with the first reaction mixture in the case where no second etherifying agent (second alkylating agent and/or second hydroxyalkylating agent) is used, or after blending the second alkali metal hydroxide solution and the second etherifying agent with the first reaction mixture in the case where the second etherifying agent is used, mixing with stirring is continued for completing the etherification reaction to obtain the second reaction mixture. In order to complete the reaction, it is preferable to apply heating after blending. In either case, the inside temperature of the reactor during mixing with stirring after blending is preferably from 80 to 120° C., and more preferably from 85 to 100° C., from the viewpoint of reaction control. In either case, the time for mixing with stirring after blending is preferably from 10 to 60 minutes, more preferably from 20 to 40 minutes, from the viewpoint of productivity.

Embodiments in which the first reaction mixture is blended with the second aqueous alkali metal hydroxide solution, the optional second alkylating agent and the optional second hydroxyalkylating agent include:

Embodiment 1 in which the first reaction mixture is blended with a second aqueous alkali metal solution to obtain a second reaction mixture;

Embodiment 2 in which the first reaction mixture is blended with one or both of a second alkylating agent and a second hydroxyalkylating agent, and then blended with a second aqueous alkali metal hydroxide solution to obtain a second reaction mixture;

Embodiment 3 in which the first reaction mixture is blended with a second alkylating agent, then blended with a second hydroxyalkylating agent, and then blended with a second aqueous alkali metal hydroxide solution to obtain a second reaction mixture;

Embodiment 4 in which the first reaction mixture is blended with a second hydroxyalkylating agent, then blended with a second alkylating agent, and then blended with a second aqueous alkali metal hydroxide solution to obtain a second reaction mixture;

Embodiment 5 in which the first reaction mixture is blended with a second aqueous alkali metal hydroxide solution, and then blended with one or both of the second alkylating agent and the second hydroxyalkylating agent to obtain a second reaction mixture;

Embodiment 6 in which the first reaction mixture is blended with a second aqueous alkali metal hydroxide solution, then blended with a second alkylating agent, and then blended with a second hydroxyalkylating agent to obtain a second reaction mixture;

Embodiment 7 in which the first reaction mixture is blended with a second aqueous alkali metal hydroxide solution, then blended with a second hydroxyalkylating agent, and then blended with a second alkylating agent to obtain a second reaction mixture;

Embodiment 8 in which the first reaction mixture is blended with a second alkylating agent, then blended with a second aqueous alkali metal hydroxide solution, and then blended with a second hydroxyalkylating agent to obtain a second reaction mixture;

Embodiment 9 in which the first reaction mixture is blended with a second hydroxyalkylating agent, then blended with a second aqueous alkali metal hydroxide solution, and then blended with a second alkylating agent to obtain a second reaction mixture;

Embodiment 10 in which the first reaction mixture is blended with a second aqueous alkali metal hydroxide solution and a second alkylating agent, or blended with a second aqueous alkali metal hydroxide solution and a second hydroxyalkylating agent, to obtain a second reaction mixture;

Embodiment 11 in which the first reaction mixture is blended with a second aqueous alkali metal hydroxide solution and a second alkylating agent, and then blended with a second hydroxyalkylating agent to obtain a second reaction mixture;

Embodiment 12 in which the first reaction mixture is blended with a second aqueous alkali metal hydroxide solution and a second hydroxyalkylating agent, and then blended with a second alkylating agent to obtain a second reaction mixture;

Embodiment 13 in which the first reaction mixture is blended with both of a second aqueous alkali metal hydroxide solution and a second hydroxyalkylating agent, and a second alkylating agent to obtain a second reaction mixture.

Embodiment 1 in which the first reaction mixture is blended with a second aqueous alkali metal hydroxide solution to obtain a second reaction mixture, and Embodiment 13 in which the first reaction mixture is blended with both of a second aqueous alkali metal hydroxide solution and a second hydroxyalkylating agent, and a second alkylating agent to obtain a second reaction mixture, are preferable, and Embodiment 1 is particularly preferable, from the viewpoint of obtaining a hydroxyalkyl alkyl cellulose having a high storage modulus G'(80° C.) and reducing the complexity of the operation.

Next, a step of purifying the obtained second reaction mixture to obtain a hydroxyalkyl alkyl cellulose will be described.

The obtained second reaction mixture may be purified in the same manner as conventional purification of a crude hydroxyalkyl alkyl cellulose. As a result, a hydroxyalkyl alkyl cellulose is obtained. The purification may be carried out, for example, by the method comprising steps of: mixing the second reaction mixture with water of from 60 to 100° C. in a stirring vessel to form a slurry to dissolve a salt generated as a byproduct, and subjecting the slurry to a separation operation to remove the salt to obtain the purified cellulose ether. Examples of the separation operation may include an operation of a pressurized rotational filter.

After the separation operation, drying with a dryer may be carried out. Examples of the dryer may include a conductive heat transfer agitated trough dryer.

The obtained hydroxyalkyl alkyl cellulose may be optionally subjected to pulverization to have a desired particle size by using a conventional pulverizer such as a ball mill, a roller mill and an impact grinder, and then optionally subjected to sieving for classification to adjust the particle size distribution.

The degree of substitution (DS) of the alkoxy groups of the obtained hydroxyalkyl alkyl cellulose is preferably from 1.60 to 2.00, more preferably from 1.65 to 1.95, still more preferably from 1.70 to 1.95, and particularly preferably from 1.80 to 1.95, from the viewpoint of both high thermal gel strength and reduction in the number of undissolved fibers. The molar substitution (MS) of hydroxyalkoxy groups of the hydroxyalkyl alkyl cellulose is preferably from 0.03 to 0.35, more preferably from 0.05 to 0.30, still more preferably from 0.15 to 0.30, and particularly preferably from 0.15 to 0.27, from the viewpoint of obtaining the desired thermal gel strength and thermal gelation temperature.

The degree of substitution (DS) of alkoxy groups of the hydroxyalkyl alkyl cellulose is increased by mixing the first reaction mixture with the second alkali metal hydroxide solution. The increase of the molar substitution (MS) of hydroxyalkoxy groups of the hydroxyalkyl alkyl cellulose is smaller than the increase of the degree of substitution (DS) of alkoxy groups of the hydroxyalkyl alkyl cellulose after mixing the first reaction mixture with the second alkali metal hydroxide solution.

Examples of the hydroxyalkyl alkyl celluloses include hydroxypropyl methyl cellulose, hydroxyethyl methyl cellulose.

Regarding the hydroxypropyl methyl cellulose, the degree of substitution (DS) of the methoxy groups is preferably from 1.60 to 2.00, more preferably from 1.65 to 1.95, still more preferably from 1.70 to 1.95, particularly preferably from 1.80 to 1.95, and the molar substitution (MS) of the hydroxypropoxy groups is preferably from 0.03 to 0.35, more preferably from 0.05 to 0.30, still more preferably from 0.15 to 0.30, particularly preferably from 0.15 to 0.27.

Regarding the hydroxyethyl methyl cellulose, the degree of substitution (DS) of methoxy groups is preferably from 1.60 to 2.00, more preferably from 1.65 to 1.95, still more preferably from 1.70 to 1.95, particularly preferably from 1.80 to 1.95, and the molar substitution (MS) of hydroxyethoxy groups is preferably from 0.03 to 0.35, more preferably from 0.05 to 0.30, still more preferably from 0.15 to 0.30, particularly preferably from 0.15 to 0.27.

The viscosity at 20° C. of the 2% by mass aqueous solution of the hydroxyalkyl alkyl cellulose is preferably from 1000 to 200,000 mPas, more preferably from 1000 to 100,000 mPas, still more preferably from 1000 to 20,000 mPas, particularly preferably from 1000 to 10,000 mPas, from the viewpoint of both viscosity or high thermal gel strength suitable for the application and a small number of undissolved fibers. The viscosity at 20° C. of a 2% by mass aqueous solution of the hydroxyalkyl alkyl cellulose may be measured using a single cylinder-type rotational viscometer in accordance with Viscosity measurement by rotational viscometer in Viscosity Determination of General Tests in the Japanese Pharmacopoeia Seventeenth Edition.

The storage modulus G'(80° C.) at 80° C. of the 2.0% by mass aqueous solution of the hydroxyalkyl alkyl cellulose is preferably from 5 to 200 Pa, more preferably from 8 to 150 Pa, still more preferably from 10 to 100 Pa, and particularly preferably from 10 to 30 Pa, from the viewpoint of improving the shape retention of the kneaded material as a binder. In general, the storage modulus represents the elastic component of the solution, i.e., the component of the characteristics that the deformation caused by a force applied to the object returns to its original state by removal of the force. The storage modulus is used as an indicator of the thermal gel strength.

A 2.0% by mass aqueous solution of hydroxyalkyl alkyl cellulose may be prepared as follows. An exact amount of hydroxyalkyl alkyl cellulose, which is equivalent to 6.00 g of the dry hydroxyalkyl alkyl cellulose, is placed in a wide-mouthed bottle (a 350 ml container having a diameter of 65 mm and a height of 120 mm), and subjected to addition of hot water (98° C.) to make a total amount of the resulting mixture to be 300 g. After a lid is placed in the container, the mixture is stirred at a rate of 350 to 450 rpm for 20 minutes until a uniform dispersion is obtained. After that, the dispersion is stirred in a water bath of 5° C. or lower for 40 minutes for dissolving the hydroxyalkyl alkyl cellulose in the water to form a solution, which is referred to as the sample solution.

The storage modulus G'(80° C.) at 80° C. of a 2.0% by mass aqueous solution of hydroxyalkyl alkyl cellulose may be measured, for example, with a rheometer such as a MCR500, MCR501 or MCR502 produced by Anton Paar GmbH.

The sample measurement part of the rheometer is adjusted to 30° C. in advance; a 2.0% by mass aqueous solution of hydroxyalkyl alkyl cellulose is poured into a CC27 measuring cup (cylindrical container have a diameter of 30 mm and a height of 80 mm) up to the marking line (25 ml) of the cup; and the measurement is started at a frequency of 1 Hz and a strain of 0.5% amplitude. The temperature of the sample measurement part is increased to 80° C. at a rate of 2° C./min. Data are collected at two points per minute. The storage modulus G' obtained by this measurement is changed as the temperature of the measurement system increases. The storage modulus at the time when the temperature of the measurement system arrives at 80° C. is defined as the storage modulus G'(80° C.) in accordance with the invention.

The number of undissolved fibers having a size of 8 to 200 μm at 25° C., as determined by the Coulter counter method in 2 ml of a 0.1% by mass aqueous hydroalkyl alkyl cellulose solution, is preferably 2500 or less, more preferably from 500 to 1800, and still more preferably from 500 to 1600, from the viewpoint of the product quality.

More specifically, the number of undissolved fibers by the Coulter counter method is determined by first dissolving the hydroxyalkyl alkyl cellulose at 25° C. in an electrolyte aqueous solution ISOTON II for a Coulter counter (produced by Beckman Coulter Co., Ltd.) in a constant temperature bath so as to prepare a 0.1% by mass aqueous solution of the hydroxyalkyl alkyl cellulose. Next, the number of undissolved fibers having a size of 8 to 200 μm present in 2 ml of the 0.1% by mass aqueous hydroxyalkyl alkyl cellulose solution is measured with a Coulter Counter TA II type (produced by Beckman Coulter Co., Ltd.) by using an aperture tube having a diameter of 400 μm.

EXAMPLES

The invention will be described in detail with reference to Examples and
Comparative Examples. It should not be construed that the invention is limited to or by Examples.

Example 1

A sheet-shaped pulp being derived from pine and having a pore volume of 0.84 ml/g, a density of 0.58 g/ml and an intrinsic viscosity of 5.9 dl/g was immersed at 20° C. in a 49% by mass aqueous sodium hydroxide solution as a first alkali metal hydroxide solution, and then pressed to remove an excess of the 49% by mass aqueous sodium hydroxide solution to obtain alkali cellulose (hereinafter also referred to as "starting alkali cellulose"). The contact time between the sheet-shaped pulp and the 49% by mass aqueous sodium hydroxide solution was 30 seconds, and the mass ratio of the 49% by mass aqueous sodium hydroxide solution to the solid component in the pulp (sodium hydroxide solution/solid component in the pulp) with respect to the immersion was 20 [kg/kg]. The molar amount of the first sodium hydroxide per mole of anhydroglucose unit of the obtained alkali cellulose, i.e., the molar ratio, was 2.95 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.66.

The 11.6 kg of the obtained alkali cellulose was placed in a jacketed internally stirred pressure-resistant reactor, and subjected to vacuum and nitrogen purge two or more times to sufficiently remove oxygen from the inside of the reactor. Next, the inside of the reactor was stirred, while controlling the inside temperature to be 60° C., and then 2.2 kg of dimethyl ether was added thereto, while keeping the inside temperature at 60° C. by temperature control. After the addition of dimethyl ether, methyl chloride as the first alkylating agent was added to the reactor over a period of 60 minutes, while increasing the inside temperature of the reactor from 60 to 80° C., so that the molar amount of the first methyl chloride per mole of anhydroglucose unit of the starting alkali cellulose was 5.81 [mol/mol]. At the same time when the addition of methyl chloride started, propylene oxide as the first hydroxyalkylating agent was added to the reactor over a period of 10 minutes to form a first reaction mixture, so that the molar amount of the first propylene oxide per mole of anhydroglucose unit of the starting alkali cellulose was 1.34 [mol/mol].

Following the completion of the addition of the first methyl chloride, a 49% by mass aqueous sodium hydroxide solution as the second alkali metal hydroxide solution was added thereto at the addition rate of 3.04 [mol/mol·hr] relative to the moles of anhydroglucose units of the starting alkali cellulose, so that the molar amount of the second sodium hydroxide per mole of anhydroglucose unit of the starting alkali cellulose, i.e., the molar ratio, was 1.52 [mol/mol] to form a second reaction mixture. The inside temperature of the reactor at the start of addition of the second aqueous sodium hydroxide solution was 80° C., and the inside temperature of the reactor was increased at a rate of 18.0° C./hr from the start of addition of the second aqueous sodium hydroxide solution until the completion of addition. The inside temperature of the reactor at the completion of the addition of the second aqueous sodium hydroxide solution was 89° C. After the completion of the addition of the second aqueous sodium hydroxide solution, stirring was continued for 30 minutes to complete the etherification reaction.

The obtained second reaction mixture was slurried by adding hot water of 95° C., washed with a rotary pressure filter, then dried with a fan dryer, pulverized with a impact grinder Victory mill, and classified with sieving to obtain hydroxypropyl methyl cellulose. The experimental conditions are shown in Table 1.

The degree of substitution (DS) of methoxy groups, the molar substitution (MS) of hydroxypropoxy groups, the viscosity at 20° C. of a 2% by mass aqueous hydroxypropyl methyl cellulose solution, the storage modulus G'(80° C.) at 80° C. of a 2% by mass aqueous hydroxypropyl methyl cellulose solution, and the number of undissolved fibers having a size of from 8 to 200 μm at 25° C. as determined in 2 ml of a 0.1% by mass aqueous hydroxypropyl methyl cellulose solution are shown in Table 2.

Example 2

Alkali cellulose was obtained in the same manner as in Example 1 except that chip-shaped pulp being derived from hemlock and having a pore volume of 0.70 ml/g, a density of 0.72 g/ml, and an intrinsic viscosity of 13.0 dl/g was used. The contact time between the pulp and the 49% by mass aqueous sodium hydroxide solution was 48 seconds, and the mass ratio of the 49% by mass aqueous sodium hydroxide solution to the solid component in the pulp (sodium hydroxide solution/solid component in the pulp) with respect to the immersion was 180 [kg/kg]. The molar amount of the first sodium hydroxide per mole of anhydroglucose unit of the obtained alkali cellulose, i.e., the molar ratio, was 3.04 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.66.

The 11.6 kg of the obtained alkali cellulose was placed in a jacketed internally stirred pressure-resistant reactor, and subjected to vacuum and nitrogen purge once to remove oxygen from the inside of the reactor. Thereafter, the first reaction mixture was prepared in the same manner as in Example 1 except that methyl chloride was used as the first methylating agent and the molar amount of the first alkylating agent per mole of anhydroglucose unit of the starting alkaline cellulose, i.e., the molar ratio, was 6.00 [mol/mol].

Subsequently, the second reaction mixture was prepared in the same manner as in Example 1 except that a 49% by mass aqueous sodium hydroxide solution as the second alkali metal hydroxide solution was added to the reactor at an addition rate of 3.14 [mol/mol·hr] relative to the moles of anhydroglucose units of the starting alkali cellulose so that the molar amount of the second sodium hydroxide per mole of anhydroglucose unit of the starting alkali cellulose, i.e., the molar ratio, was 1.57 [mol/mol]; and the inside temperature of the reactor was increased at a rate of 16.1° C./hr from the start of the addition of the second aqueous sodium hydroxide solution until the completion of addition, and was 90.7° C. at the completion of the addition of the second aqueous sodium hydroxide solution.

The second reaction mixture thus obtained was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 μm at 25° C. in 2 ml of a 0.1% by mass aqueous solution of the hydroxypropyl methyl cellulose as measured by using an aperture tube having a diameter of 400 μm are shown in Table 2.

Example 3

Alkali cellulose was obtained in the same manner as in Example 1 except that sheet-shaped pulp being derived from hemlock and having a pore volume of 0.70 ml/g, a density of 0.72 g/ml, and a intrinsic viscosity of 13.0 dl/g was used. The contact time between the pulp and the 49% by mass aqueous sodium hydroxide solution was 55 seconds, and the mass ratio of the 49% by mass aqueous sodium hydroxide solution to the solid component in the pulp (sodium hydroxide solution/solid component in the pulp) with respect to the immersion was 20 [kg/kg]. The molar amount of the first sodium hydroxide per mole of anhydroglucose unit of the obtained alkali cellulose, i.e., the molar ratio, was 3.35 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.740.

The first reaction mixture was prepared from the obtained alkali cellulose in the same manner as in Example 1 except that methyl chloride was used as the first methylating agent and the molar amount of the first methylating agent per mole of anhydroglucose unit of the starting alkaline cellulose, i.e., the molar ratio, was 6.00 [mol/mol].

The second reaction mixture was prepared in the same manner as in Example 1 except that a 49% by mass aqueous sodium hydroxide solution as the second alkali metal hydroxide solution was added to the reactor at an addition rate of 2.83 [mol/mol·hr] relative to the moles of anhydroglucose units of the starting alkali cellulose, following the completion of the addition of the first methyl chloride, so that the molar amount of the second sodium hydroxide per mole of anhydroglucose unit of the starting alkaline cellulose, i.e., the molar ratio, was 1.18 [mol/mol]; and the inside temperature of the reactor was increased at a rate of 18.0° C./hr from the start of the addition of the second aqueous sodium hydroxide solution until the completion of addition, and was 79° C. at the start of the addition of the second aqueous sodium hydroxide solution, while 91° C. at the completion of the addition of the second aqueous sodium hydroxide solution.

The resulting second reaction mixture was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 μm at 25° C. in 2 ml of a 0.1% by mass aqueous solution of the hydroxypropyl methyl cellulose as measured by using an aperture tube having a diameter of 400 μm are shown in Table 2.

Example 4

Alkali cellulose was obtained in the same manner as in Example 1 except that chip-shaped pulp being derived from spruce and having a pore volume of 0.56 ml/g, a density of 0.76 g/ml, and an intrinsic viscosity of 13.5 dl/g was used. The contact time between the pulp and the 49% by mass aqueous sodium hydroxide solution was 68 seconds, and the mass ratio of the 49% by mass aqueous sodium hydroxide solution to the solid component in the pulp (sodium hydroxide solution/solid component in the pulp) with respect to the immersion was 180 [kg/kg]. The molar amount of the first sodium hydroxide per mole of anhydroglucose unit of the obtained alkali cellulose, i.e., the molar ratio, was 2.95 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.66.

The 11.6 kg of the obtained alkali cellulose was placed in a jacketed internally stirred pressure-resistant reactor, and subjected to vacuum and nitrogen purge once to remove oxygen from the inside of the reactor. Thereafter, the first reaction mixture was prepared in the same manner as in Example 1.

Subsequently, the second reaction mixture was prepared in the same manner as in Example 1 except that a 49% by mass aqueous sodium hydroxide solution as the second alkali metal hydroxide solution was added to the reactor at an addition rate of 3.08 [mol/mol·hr] relative to the moles of anhydroglucose units of the starting alkali cellulose so that the molar amount of the second sodium hydroxide per mole of the anhydroglucose units of the starting alkali cellulose was 1.54 [mol/mol]; and the inside temperature of the reactor was increased at a rate of 18.0° C./hr from the start of the addition of the second aqueous sodium hydroxide solution until the completion of addition, and was 90.5° C. at the completion of the addition of the second aqueous sodium hydroxide solution.

The second reaction mixture thus obtained was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 μm at 25° C. in 2 ml of a 0.1% by mass aqueous solution of the hydroxypropyl methyl cellulose as measured by using an aperture tube having a diameter of 400 μm are shown in Table 2.

Example 5

Alkali cellulose was obtained in the same manner as in Example 1 except that sheet-shaped pulp being derived from spruce and having a pore volume of 0.56 ml/g, a density of 0.76 g/ml, and an intrinsic viscosity of 13.5 dl/g was used. The contact time between the pulp and the 49% by mass aqueous sodium hydroxide solution was 73 seconds, and the mass ratio of the 49% by mass aqueous sodium hydroxide solution to the solid component in the pulp (sodium hydroxide solution/solid component in the pulp) with respect to the immersion was 20 [kg/kg]. The molar amount of the first sodium hydroxide per mole of anhydroglucose unit of the obtained alkali cellulose, i.e., the molar ratio, was 2.95 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.66.

The 11.6 kg of the obtained alkali cellulose was placed in a jacketed internally stirred pressure-resistant reactor, and subjected to vacuum and nitrogen purge once to remove oxygen from the inside of the reactor. Thereafter, the first reaction mixture was prepared in the same manner as in Example 1.

Subsequently, the second reaction mixture was prepared in the same manner as in Example 1 except that a 49% by mass aqueous sodium hydroxide solution as the second alkali metal hydroxide solution was added to the reactor at an addition rate 3.08 [mol/mol·hr] relative to the moles of the anhydroglucose units of the starting alkali cellulose so that the molar amount of the second sodium hydroxide per mole of anhydroglucose unit of the starting alkali cellulose, i.e., the molar ratio, was 1.54 [mol/mol]; and the inside temperature of the reactor was increased at a rate of 19.0° C./hr from the start of the addition of the second aqueous sodium hydroxide solution until the completion of addition, and was 91.0° C. at the completion of the addition of the second aqueous sodium hydroxide solution.

The second reaction mixture thus obtained was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 μm at 25° C. in 2 ml of a 0.1% by mass aqueous solution of the hydroxypropyl methyl cellulose as measured by using an aperture tube having a diameter of 400 μm are shown in Table 2.

Example 6

Alkali cellulose was obtained in the same manner as in Example 1 except that chip-shaped pulp being derived from pine and having a pore volume of 0.84 ml/g, a density of 0.58 g/ml, and an intrinsic viscosity of 5.9 dl/g was used. The contact time between the chip-shaped pulp and the 49% by mass aqueous sodium hydroxide solution was 35 seconds, and the mass ratio of the 49% by mass aqueous sodium hydroxide solution to the solid component in the pulp (sodium hydroxide solution/solid component in the pulp) with respect to the immersion was 180 [kg/kg]. The molar amount of the first sodium hydroxide per mole of anhydroglucose unit of the obtained alkali cellulose, i.e., the molar ratio, was 3.20 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.75.

The 11.6 kg of the obtained alkali cellulose was placed in a jacketed internally stirred pressure-resistant reactor, and subjected to vacuum and nitrogen purge two or more times to sufficiently remove oxygen from the inside of the reactor. Thereafter, the first reaction mixture was prepared in the same manner as in Example 1 except that methyl chloride was used as the first methylating agent; the molar amount of the first alkylating agent per mole of anhydroglucose unit of the starting alkali cellulose, i.e., the molar ratio, was in 5.55 [mol/mol]; propylene oxide was used as the first hydroxyalkylating agent; and the molar amount of the first propylene oxide per mole of anhydroglucose unit of the starting alkali cellulose was 0.67 [mol/mol].

Subsequently, the second reaction mixture was prepared in the same manner as in Example 1 except that a 49% by mass aqueous sodium hydroxide solution was added as the second alkali metal hydroxide solution was added to the reactor at an addition rate of 2.92 [mol/mol·hr] relative to the moles of the anhydroglucose units of the starting alkali cellulose so that the molar amount of the second sodium hydroxide per mole of the anhydroglucose unit of the starting alkali cellulose, i.e., the molar ratio, was 1.07 [mol/mol]; and the inside temperature of the reactor was increased at a rate of 15.9° C./hr from the start of the addition of the second aqueous sodium hydroxide solution until the completion of addition, and was 89.3° C. at the completion of the addition of the second aqueous sodium hydroxide solution.

The second reaction mixture thus obtained was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 µm at 25° C. in 2 ml of a 0.1% by mass aqueous solution of the hydroxypropyl methyl cellulose as measured by using an aperture tube having a diameter of 400 µm are shown in Table 2.

Example 7

Alkali cellulose was obtained in the same manner as in Example 1 except that sheet-shaped pulp being derived from pine and having a pore volume of 0.93 ml/g, a density of 0.61 g/ml, and an intrinsic viscosity of 8.2 dl/g was used. The contact time between the pulp and the 49% by mass aqueous sodium hydroxide solution was 25 seconds, and the mass ratio of the 49% by mass aqueous sodium hydroxide solution to the solid component in the pulp (sodium hydroxide solution/solid component in the pulp) with respect to the immersion was 20 [kg/kg]. The molar amount of the first sodium hydroxide per mole of anhydroglucose unit of the obtained alkali cellulose, i.e., the molar ratio, was 2.95 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.66.

The 11.6 kg of the obtained alkali cellulose was placed in a jacketed internally stirred pressure-resistant reactor, and subjected to vacuum and nitrogen purge two or more times to sufficiently remove oxygen from the inside of the reactor. Thereafter, the first reaction mixture was prepared in the same manner as in Example 1.

Subsequently, the second reaction mixture was prepared in the same manner as in Example 1 except that a second aqueous sodium hydroxide solution was added to the reactor at an addition rate 3.04 [mol/mol·hr] relative to moles of the anhydroglucose unti of the starting alkali cellulose so that the molar amount of the second sodium hydroxide per anhydroglucose unit of the starting alkali cellulose, i.e., the molar ratio, was 1.52 [mol/mol; and the inside temperature of the reactor was increased at a rate of 21.4° C./hr from the start of the addition of the second aqueous sodium hydroxide solution until the completion of addition, and was 90.7° C. at the completion of the addition of the second aqueous sodium hydroxide solution.

The obtained second reaction mixture was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 µm at 25° C. in 2 ml of a 0.1% by mass aqueous solution of the hydroxypropyl methyl cellulose as measured by using an aperture tube having a diameter of 400 µm are shown in Table 2.

Comparative Example 1

Wood pulp having a density of 0.58 g/ml and an intrinsic viscosity of 5.9 dl/g was pulverized with a pulverizer to obtain powdery cellulose pulp. An amount of the powdered cellulose pulp corresponding to a cellulose content of 6.0 kg was placed in a jacketed internally stirred pressure-resistant reactor, and subjected to vacuum and nitrogen purge once to remove oxygen from the inside of the reactor. Next, the inside of the reactor was stirred while controlling the inside temperature of the reactor to 60° C., and a 49% by mass aqueous sodium hydroxide solution as the first alkali metal hydroxide solution was added to the reactor at an addition rate of 10.72 [mol/mol·hr] relative to the moles of the anhydroglucose units of the starting cellulose pulp so as to make the molar amount of the first sodium hydroxide per mole of anhydroglucose unit of the alkali cellulose to be 2.68 [mol/mol], thereby obtaining the first alkali cellulose (hereinafter also referred to as "starting alkali cellulose"). The ratio of the mass of the first sodium hydroxide in the first aqueous sodium hydroxide solution to the total mass of the first sodium hydroxide and the second sodium hydroxide in the second aqueous sodium hydroxide solution described below was 0.60.

The 11.6 kg of the obtained alkali cellulose was placed in a jacketed internally stirred pressure-resistant reactor, and subjected to vacuum and nitrogen purge two or more times to sufficiently remove oxygen from the inside of the reactor. Thereafter, the first reaction mixture was prepared in the same manner as in Example 1.

Following the completion of the addition of the first methyl chloride, a 49% by mass aqueous sodium hydroxide solution as the second alkali metal hydroxide solution was added to the reactor at an addition rate of 3.58 [mol/mol·hr] relative to the moles of the anhydroglucose units of the starting alkali cellulose so that the molar amount of the second sodium hydroxide per mole of anhydroglucose unit of the starting alkali cellulose, i.e., the mole ratio, was 1.79 [mol/mol] to prepare a second reaction mixture. The inside temperature of the reactor at the start of addition of the second sodium hydroxide solution was 80.5° C., and the inside temperature of the reactor was increased at the rate of 19.0° C./hr from the start of the addition of the second aqueous sodium hydroxide solution until the completion of addition. The inside temperature of the reactor was 90° C. at the completion of the addition of the second aqueous sodium hydroxide solution. After the completion of the addition of the second aqueous sodium hydroxide solution, stirring was continued for 30 minutes to complete the etherification reaction. The ratio of the mass of the first sodium hydroxide in the first aqueous sodium hydroxide solution to the total mass of the first sodium hydroxide and the second sodium hydroxide in the second aqueous sodium hydroxide solution was 0.6.

The obtained second reaction mixture was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 µm at 25° C. in 2 ml of a 0.1% by mass aqueous solution of the hydroxypropyl methyl cellulose as measured by using an aperture tube having a diameter of 400 µm are shown in Table 2. Compared with the results of Example 1, the storage modulus G'(80° C.) was increased, but the number of undissolved fibers was also increased.

Comparative Example 2

The first alkali cellulose was obtained in the same manner as in Comparative Example 1 except that the first aqueous sodium hydroxide solution was added at an addition rate 14.64 [mol/mol·hr] relative to the moles of the anhydroglucose units of the starting cellulose pulp so as to make the molar amount of the first sodium hydroxide per mole of anhydroglucose unit of the alkali cellulose to be 3.66 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.80.

The first reaction mixture was prepared in the same manner as in Example 1 except that methyl chloride was used as the first alkylating agent, and the molar amount of the first methyl chloride per mole of anhydroglucose unit of the starting alkali cellulose, i.e., the molar ratio, was 5.93 [mol/mol]; and propylene oxide was used as the first hydroxyalkylating agent, and the molar amount of the first propylene oxide per mole of anhydroglucose unit of the starting alkali cellulose was 1.35 [mol/mol].

Following the completion of the addition of the first methyl chloride, a 49% by mass aqueous sodium hydroxide solution as the second alkali metal hydroxide solution was added to the reactor at an addition rate 1.82 [mol/mol·hr] relative to the moles of the anhydroglucose unit of the starting alkali cellulose so that the molar amount of the second sodium hydroxide per mole of anhydroglucose unit of the starting alkali cellulose was 0.92 [mol/mol] to prepare a second reaction mixture. The inside temperature of the reactor at the start of the addition of the second aqueous sodium hydroxide solution was 79.5° C., and the inside temperature of the reactor was increased at the rate of 25.0° C./hr from the start of the addition of the second aqueous sodium hydroxide solution until the completion of addition. The inside temperature of the reactor was 92.0° C. at the completion of the addition of the second aqueous sodium hydroxide solution. After the completion of the addition of the second aqueous sodium hydroxide solution, stirring was continued for 30 minutes to complete the etherification reaction.

The obtained second reaction mixture was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 µm at 25° C. in 2 ml of a 0.1% by mass aqueous solution of the hydroxypropyl methyl cellulose as measured by using an aperture tube having a diameter of 400 µm are shown in Table 2. Compared with the results of Example 1, the storage modulus G'(80° C.) was comparable, but the number of undissolved fibers was large.

Comparative Example 3

A sheet-shaped pulp being derived from spruce and having a pore volume of 1.25 ml/g, a density of 0.47 g/ml, and an intrinsic viscosity of 13.5 dl/g was immersed in a 49% by mass aqueous sodium hydroxide solution of 20° C. as the first alkali metal hydroxide solution, and then pressed to remove an excess of the 49% by mass aqueous sodium hydroxide solution, thereby obtaining alkali cellulose. The contact time between the pulp and the 49% by mass aqueous sodium hydroxide solution was 10 seconds, and it was difficult to further shorten the period of time from the start of the contact with the aqueous sodium hydroxide solution to the end of the liquid removal by press. The mass ratio of the 49% by mass aqueous sodium hydroxide solution to the solid component in the pulp with respect to the immersion step was 20 [kg/kg]. The molar amount of the first sodium hydroxide per mole of anhydroglucose unit of the obtained alkali cellulose, i.e., the molar ratio, was 3.70 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.85.

The 11.6 kg of the obtained alkali cellulose was placed in a jacketed internally stirred pressure-resistant reactor, and subjected to vacuum and nitrogen purge once to remove oxygen from the inside of the reactor. Thereafter, a first reaction mixture was prepared in the same manner as in Example 1 except that the molar amount of the first methyl chloride per mole of anhydroglucose unit of the starting alkali cellulose, i.e., the molar ratio, was 5.65 [mol/mol]; and the molar amount of the first propylene oxide as the first hydroxyalkylating agent per mole of anhydroglucose unit of the starting alkali cellulose was 1.38 [mol/mol].

Following the completion of the addition of the first methyl chloride, a 49% by mass aqueous sodium hydroxide solution as the second alkali metal hydroxide solution was added to the reactor at an addition rate of 1.30 [mol/mol·hr] relative to the moles of the starting alkali cellulose so that the molar amount of the second sodium hydroxide per mole of anhydroglucose unit of the starting alkali cellulose, i.e., the molar ratio, was 0.65 [mol/mol] to form a second reaction mixture. The inside temperature of the reactor was 80.5° C. at the start of addition of the second aqueous sodium hydroxide solution, and was increased at a rate of 18.0° C./hr from the start of the addition of the second aqueous sodium hydroxide solution until the completion of addition. The inside temperature of the reactor was 89.5° C. at the completion of the addition of the second aqueous sodium hydroxide solution. After the completion of the addition of the second aqueous sodium hydroxide solution, stirring was continued for 30 minutes to complete the etherification reaction.

The obtained second reaction mixture was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 μm at 25° C. in 2 ml of a 0.1% by mass aqueous solution of the hydroxypropyl methyl cellulose as measured by using an aperture tube having a diameter of 400 μm are shown in Table 2. Compared with the results of Example 3, although the number of undissolved fibers was smaller, the storage modulus G'(80° C.) was lower.

Comparative Example 4

Alkali cellulose was obtained in the same manner as in Comparative Example 3 except that chip-shaped pulp being derived from spruce and having a pore volume of 1.12 ml/g, a density of 0.55 g/ml, and an intrinsic viscosity of 7.0 dl/g was used. The mass ratio of the 49% by mass aqueous sodium hydroxide to the solid component in the pulp with respect to the immersion was 180 [kg/kg]. The molar amount of the first sodium hydroxide per mole of anhydroglucose unit of the obtained alkali cellulose, i.e., the molar ratio, was 3.66 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.849.

The 11.6 kg of the obtained alkali cellulose was placed in a jacketed internally stirred pressure-resistant reactor, and subjected to vacuum and nitrogen purge once to remove oxygen from the inside of the reactor. The first reaction mixture was prepared in the same manner as in Example 1 except that the molar amount of the first methyl chloride per mole of anhydroglucose unit of the starting alkali cellulose, i.e., the molar ratio, was 4.44 [mol/mol], and the molar amount of the first propylene oxide per mole of anhydroglucose unit of the starting alkali cellulose, i.e., the molar ratio, was 0.67 [mol/mol].

Following the completion of the addition of the first methyl chloride, a 49% by mass aqueous sodium hydroxide solution as the second alkali metal hydroxide solution was added to the reactor at an addition rate of 1.30 [mol/mol·hr] relative to the moles of the starting alkali cellulose so that the molar amount of the second sodium hydroxide per mole of anhydroglucose units of the starting alkali cellulose was 0.65 [mol/mol]. Simultaneously with the addition of the second alkali metal hydroxide solution, methyl chloride as the second alkylating agent was added to the reactor over a period of 15 minutes so that the molar amount of the second methyl chloride per mole of anhydroglucose unit of the starting alkali cellulose, i.e., the molar ratio, was 1.16 [mol/mol] to obtain the second reaction mixture. Herein, the molar amount of the second alkylating agent to the total molar amount of the first and second alkylating agents, i.e., the molar ratio, was 0.2. The inside temperature of the reactor was 80.5° C. at the start of the addition of the second aqueous sodium hydroxide solution, and was increased at a rate of 18.0° C./hr from the start of the addition of the second aqueous sodium hydroxide solution until the completion of addition. The inside temperature of the reactor was 89.5° C. at the completion of the addition of the second aqueous sodium hydroxide solution. After the completion of the addition of the second aqueous sodium hydroxide solution, the etherification reaction was completed in the same manner as in Example 1. The ratio of the mass of the first sodium hydroxide in the first aqueous sodium hydroxide solution to the total mass of the first sodium hydroxide and the second sodium hydroxide in the second aqueous sodium hydroxide solution was 0.85.

The obtained second reaction mixture was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 μm at 25° C. in 2 ml of a 0.1% by mass aqueous solution of the hydroxypropyl methyl cellulose as measured by using an aperture tube having a diameter of 400 μm are shown in Table 2. Compared with the results of Example 2, although the number of undissolved fibers was smaller, the storage modulus G'(80° C.) was lower.

Comparative Example 5

Alkali cellulose was obtained in the same manner as in Comparative Example 3 except that chip-shaped pulp being derived from spruce and having a pore volume of 1.15 ml/g, a density of 0.50 g/ml, and an intrinsic viscosity of 10.0 dl/g was used. The molar amount of the first sodium hydroxide per mole of anhydroglucose unit of the obtained alkali cellulose, i.e., the molar ratio, was 3.68 [mol/mol]. The mass ratio of the 49% by mass aqueous sodium hydroxide solution to the solid component in the pup with respect to the immersion was 180 [kg/kg]. The ratio of the mass of the first sodium hydroxide in the first aqueous sodium hydroxide solution to the total mass of the first sodium hydroxide and the second sodium hydroxide in the second aqueous sodium hydroxide solution described below was 0.850.

The 11.6 kg of the obtained alkali cellulose was placed in a jacketed internally stirred pressure-resistant reactor, and subjected to vacuum and nitrogen purge two or more times to sufficiently remove oxygen from the inside of the reactor. Thereafter, the first reaction mixture was prepared in the same manner as in Comparative Example 3.

Following the completion of the addition of the first methyl chloride, a 49% by mass aqueous sodium hydroxide solution as the second alkali metal hydroxide solution was added to the reactor at an addition rate of 1.30 [mol/mol·hr] relative to the moles of the anhydroglucose units of the starting alkali cellulose so that the molar amount of the second sodium hydroxide per mole of anhydroglucose unit of the starting alkali cellulose was 0.65 [mol/mol] to prepare a second reaction mixture. The inside temperature of the reactor at the start of the addition of the second aqueous sodium hydroxide solution was 80.5° C., and was increased at a rate of 18.0° C./hr from the start of addition of the second aqueous sodium hydroxide solution until the completion of addition. The inside temperature of the reactor was 89.5° C. at the completion of the addition of the second aqueous sodium hydroxide solution. After the completion of the addition of the second aqueous sodium hydroxide solution, the etherification reaction was completed in the same manner as in Example 1. The ratio of the mass of the first sodium hydroxide in the first aqueous sodium hydroxide solution to the total mass of the first sodium hydroxide and the second sodium hydroxide in the second aqueous sodium hydroxide solution was 0.85.

The obtained second reaction mixture was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 μm at 25° C. in 2 ml of a 0.1% by mass aqueous solution of the hydroxypropyl methyl cellulose as measured by using an aperture tube having a diameter of 400 μm are shown in Table 2. Compared with the results of Example 2, although the number of undissolved fibers was smaller, the storage modulus G'(80° C.) was lower.

Comparative Example 6

Alkali cellulose was obtained in the same manner as in Comparative Example 3 except that sheet-shaped pulp being derived from spruce and having a pore volume of 1.15 ml/g, a density of 0.50 g/ml, and an intrinsic viscosity of 10.0 dl/g was used. The molar amount of the first sodium hydroxide per mole of anhydroglucose unit of the obtained alkali cellulose, i.e., the molar ratio, was 3.68 [mol/mol]. The mass ratio of the 49% by mass aqueous sodium hydroxide solution to the solid component in the pulp with respect to the immersion was 180 [kg/kg]. The ratio of the mass of the first sodium hydroxide in the first aqueous sodium hydroxide solution to the total mass of the first sodium hydroxide and the second sodium hydroxide in the second aqueous sodium hydroxide solution described below was 0.850.

The 11.6 kg of the obtained alkali cellulose was placed in a jacketed internally stirred pressure-resistant reactor, and subjected to vacuum and nitrogen purge two or more times to sufficiently remove oxygen from the inside of the reactor. The first reaction mixture was prepared in the same manner as in Comparative Example 3.

Following the completion of the addition of the first methyl chloride, a 49% by mass aqueous sodium hydroxide solution as the second alkali metal hydroxide solution was added to the reactor at an addition rate of 1.30 [mol/mol·hr] relative to the moles of the anhydroglucose units of the starting alkali cellulose so that the molar amount of the second sodium hydroxide per mole of anhydroglucose units of the starting alkali cellulose was 0.65 [mol/mol] to prepare a second reaction mixture. The inside temperature of the reactor at the start of the addition of the second aqueous sodium hydroxide solution was 80.5° C., and was increased at a rate of 19.0° C./hr from the start of the addition of the second aqueous sodium hydroxide solution until the completion of addition. The inside temperature of the reactor was 90.5° C. at the completion of the addition of the second aqueous sodium hydroxide solution. After the completion of the addition of the second aqueous sodium hydroxide solution, the etherification reaction was completed in the same manner as in Example 1. The ratio of the mass of the first sodium hydroxide in the first aqueous sodium hydroxide solution to the total mass of the first sodium hydroxide and the second sodium hydroxide in the second aqueous sodium hydroxide solution was 0.85.

The obtained second reaction mixture was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 μm at 25° C. in 2 ml of a 0.1% by mass aqueous solution of the hydroxypropyl methyl cellulose as measured by using an aperture tube having a diameter of 400 μm are shown in Table 2. Compared with the results of Example 3, although the number of undissolved fibers was smaller, the storage modulus G'(80° C.) was lower.

Comparative Example 7

Alkali cellulose was obtained in the same manner as in Example 1 except that chip-shaped pulp being derived from spruce and having a pore volume of 0.49 ml/g, a density of 0.76 g/ml, and an intrinsic viscosity of 15.0 dl/g was used. The contact time between the pulp and the 49% by mass aqueous sodium hydroxide solution was 80 seconds, and the mass ratio of the 49% by mass aqueous sodium hydroxide solution to the solid component in the pulp (sodium hydroxide solution/solid component in the pulp) with respect to the immersion was 20 [kg/kg]. The molar amount of the first sodium hydroxide per mole of anhydroglucose unit of the obtained alkali cellulose, i.e., the molar ratio, was 2.95 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.66.

The 11.6 kg of the obtained alkali cellulose was placed in a jacketed internally stirred pressure-resistant reactor, and subjected to vacuum and nitrogen purge once to remove oxygen from the inside of the reactor. Thereafter, the first reaction mixture was prepared in the same manner as in Example 1.

Subsequently, the second reaction mixture was prepared in the same manner as in Example 1 except that 49% by mass aqueous sodium hydroxide solution as the second alkali metal hydroxide solution was added to the reactor at an addition rate of 3.04 [mol/mol·hr] relative to the moles of the anhydroglucose units of the starting alkali cellulose so that the molar amount of the second sodium hydroxide per mole of anhydrous glucose unit of the starting alkali cellulose, i.e., the molar ratio, was 1.54 [mol/mol]; and the inside temperature of the reactor was increased at a rate of 19.0°

C./hr from the start of the addition of the second aqueous sodium hydroxide solution until the completion of addition, and was 90.0° C. at the completion of the addition of the second aqueous sodium hydroxide solution.

The second reaction mixture thus obtained was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 µm at 25° C. in 2 ml of a 0.1% by mass aqueous solution of the hydroxypropyl methyl cellulose as measured by using an aperture tube having a diameter of 400 µm are shown in Table 2. Compared with the results of Example 4, the number of undissolved fibers was larger.

Comparative Example 8

Alkali cellulose was obtained in the same manner as in Example 1 except that chip-shaped pulp being derived from spruce and having a pore volume of 0.49 ml/g, a density of 0.76 g/ml, and an intrinsic viscosity of 15.0 dl/gpulp was used. The contact time between the pulp and the 49% by mass aqueous sodium hydroxide solution was 85 seconds, and the mass ratio of the 49% by mass aqueous sodium hydroxide solution to the solid component in the pulp (sodium hydroxide solution/solid component in the pulp) with respect to the immersion was 180 [kg/kg]. The molar amount of the first sodium hydroxide per mole of anhydroglucose unit of the obtained alkali cellulose, i.e., the molar ratio, was 2.95 [mol/mol]. The ratio of the mass of the first sodium hydroxide in the first aqueous sodium hydroxide solution to the total mass of the first sodium hydroxide and the second sodium hydroxide in the second aqueous sodium hydroxide solution described below was 0.66.

The 11.6 kg of the obtained alkali cellulose was placed in a jacketed internally stirred pressure-resistant reactor, and subjected to vacuum and nitrogen purge once to remove oxygen from the inside of the reactor. Thereafter, the first reaction mixture was prepared in the same manner as Example 1.

Subsequently, the second reaction mixture was prepared in the same manner as in Example 1 except that a 49% by mass aqueous sodium hydroxide solution as the second alkali metal hydroxide solution was added to the reactor at an addition rate of 3.04 [mol/mol·hr] relative to the moles of the anhydroglucose unit of the starting alkali cellulose so that the molar amount of the second sodium hydroxide per mole of anhydrous glucose unit of the starting alkali cellulose, i.e., the molar ratio, was 1.54 [mol/mol]; and the inside temperature of the reactor was increased at a rate of 18.0° C./hr from the start of the addition of the second aqueous sodium hydroxide solution until the completion of the addition, and was 90.5° C. at the completion of the addition of the second aqueous sodium hydroxide solution.

The second reaction mixture thus obtained was purified and pulverized in the same manner as in Example 1 to obtain hydroxypropyl methyl cellulose. The experimental conditions are shown in Table 1.

A degree of substitution (DS) of methoxy groups and a molar substitution (MS) of hydroxypropoxy groups of the obtained hydroxypropyl methyl cellulose, a viscosity at 20° C. as determined in a 2% by mass aqueous solution of the hydroxypropyl methyl cellulose, a storage modulus G'(80° C.) at 80° C. as determined in a 2% by mass aqueous solution of the hydroxypropyl methyl cellulose, and the number of undissolved fibers having a size of from 8 to 200 µm at 25° C. in 2 ml of a 0.1% by mass aqueous solution of the hydroxypropyl methyl cellulose as measured by using an aperture tube having a diameter of 400 µm are shown in Table 2. Compared with the results of Example 5, the number of undissolved fibers was larger.

TABLE 1

| | pulp | | | | first NaOH | | alkylating agent | hydroxyalkylating agent | second NaOH | temprature |
|---|---|---|---|---|---|---|---|---|---|---|
| | pore volume (ml/g) | density (g/ml) | intrinsic viscosity (dl/g) | shape | moles per mole of AGU of starting alkali cellulose (mol/mol) | mass ratio to total of first & second NaOHs | moles per mole of AGU of starting alkali cellulose (mol/mol) | moles per mole of AGU of starting alkali cellulose (mol/mol) | blending rate (mol/mol) | increase rate (° C./hr) |
| Example1 | 0.84 | 0.58 | 5.9 | sheet | 2.95 | 0.66 | 5.81 | 1.34 | 3.04 | 18.0 |
| Example2 | 0.70 | 0.72 | 13.0 | chips | 3.04 | 0.66 | 6.00 | 1.34 | 3.14 | 16.1 |
| Example3 | 0.70 | 0.72 | 13.0 | sheet | 3.35 | 0.74 | 6.00 | 1.34 | 2.83 | 18.0 |
| Example4 | 0.56 | 0.76 | 13.5 | chips | 2.95 | 0.66 | 5.81 | 1.34 | 3.08 | 18.0 |
| Example5 | 0.56 | 0.76 | 13.5 | sheet | 2.95 | 0.66 | 5.81 | 1.34 | 3.08 | 19.0 |
| Example6 | 0.84 | 0.58 | 5.9 | chips | 3.20 | 0.75 | 5.55 | 0.67 | 2.92 | 15.9 |
| Example7 | 0.93 | 0.61 | 8.2 | sheet | 2.95 | 0.66 | 5.81 | 1.34 | 3.04 | 21.4 |
| Comp. Ex. 1 | 0.84 | 0.58 | 5.9 | powder | 2.68 | 0.60 | 5.81 | 1.34 | 3.58 | 19.0 |
| Comp. Ex. 2 | 0.84 | 0.58 | 5.9 | powder | 3.66 | 0.80 | 5.93 | 1.35 | 1.84 | 25.0 |
| Comp. Ex. 3 | 1.25 | 0.47 | 13.5 | sheet | 3.70 | 0.85 | 5.65 | 1.38 | 1.30 | 18.0 |
| Comp. Ex. 4* | 1.12 | 0.55 | 7.0 | chips | 3.66 | 0.85 | 4.44 | 0.67 | 1.30 | 18.0 |
| Comp. Ex. 5 | 1.15 | 0.50 | 10.0 | chips | 3.68 | 0.85 | 5.65 | 1.38 | 1.30 | 18.0 |
| Comp. Ex. 6 | 1.15 | 0.50 | 10.0 | sheet | 3.68 | 0.85 | 5.65 | 1.38 | 1.30 | 19.0 |
| Comp. Ex. 7 | 0.49 | 0.76 | 15.0 | chips | 2.95 | 0.66 | 5.81 | 1.34 | 3.04 | 19.0 |
| Comp. Ex. 8 | 0.49 | 0.76 | 15.0 | sheet | 2.95 | 0.66 | 5.81 | 1.34 | 3.04 | 18.0 |

TABLE 1-continued

| | pulp | | | | first NaOH | | alkylating agent | hydroxyalkylating agent | | |
|---|---|---|---|---|---|---|---|---|---|---|
| | pore volume (ml/g) | density (g/ml) | intrinsic viscosity (dl/g) | shape | moles per mole of AGU of starting alkali cellulose (mol/mol) | mass ratio to total of first & second NaOHs | moles per mole of AGU of starting alkali cellulose (mol/mol) | moles per mole of AGU of starting alkali cellulose (mol/mol) | second NaOH blending rate (mol/mol) | temprature increase rate (° C./hr) |

*In Comparative Example 4, the alkylating agent was blended twice. The moles of the first alkylating agent per mole of AGU of the starting alkali cellulose was 4.44 mol/mol, and the moles of the second alkylating agent per mole of AGU of the starting alkali cellulose was 1.16 mol/mol, and the ratio of the mole of the second alkylating agent to the total mole of the first and second alkylating agents was 0.2.

TABLE 2

| | pore volume (ml/g) | how to bring the pulp into contact with NaOH | degree of substitution (DS) of methoxy | molar substitution (MS) of hydroxy-propoxy | viscosity at 20° C. as determined in 2% by mass aqueous solution (mPa · s) | storage modulus at 80° C. as determined in 2% by mass aqueous solution (Pa) | number of undissolved fibers having a size of 8 to 200 μm at 25° C. in 2 ml of 0.1% by mass aqueous solution |
|---|---|---|---|---|---|---|---|
| Example1 | 0.84 | immersion of sheet-shaped pulp into aqueous NaOH solution | 1.90 | 0.26 | 1600 | 16 | 1200 |
| Example2 | 0.70 | immersion of chip-shaped pulp into aqueous NaOH solution | 1.90 | 0.26 | 9000 | 17 | 1020 |
| Example3 | 0.70 | immersion of sheet-shaped pulp into aqueous NaOH solution | 1.90 | 0.26 | 9000 | 11 | 800 |
| Example4 | 0.56 | immersion of sheet-shaped pulp into aqueous NaOH solution | 1.90 | 0.26 | 9000 | 13 | 1900 |
| Example5 | 0.56 | immersion of chip-shaped pulp into aqueous NaOH solution | 1.90 | 0.25 | 9000 | 16 | 2100 |
| Example6 | 0.84 | immersion of chip-shaped pulp into aqueous NaOH solution | 1.83 | 0.17 | 1650 | 25 | 1500 |
| Example7 | 0.93 | immersion of sheet-shaped pulp into aqueous NaOH solution | 1.90 | 0.26 | 5000 | 18 | 1350 |
| Comp. Ex. 1 | 0.84 | immersion of powdery pulp into aqueous NaOH solution | 1.91 | 0.26 | 1600 | 60.5 | 4500 |
| Comp. Ex. 2 | 0.84 | immersion of powdery pulp into aqueous NaOH solution | 1.90 | 0.26 | 1700 | 14 | 2850 |
| Comp. Ex. 3 | 1.25 | immersion of sheet-shaped pulp into aqueous NaOH solution | 1.90 | 0.26 | 9200 | 1.9 | 360 |
| Comp. Ex. 4 | 1.12 | immersion of chip-shaped pulp into aqueous NaOH solution | 1.83 | 0.17 | 1800 | 2.1 | 880 |
| Comp. Ex. 5 | 1.12 | immersion of chip-shaped pulp into aqueous NaOH solution | 1.90 | 0.26 | 8800 | 1.8 | 400 |
| Comp. Ex. 6 | 1.15 | immersion of sheet-shaped pulp into aqueous NaOH solution | 1.90 | 0.26 | 8800 | 1.8 | 400 |
| Comp. Ex. 7 | 0.50 | immersion of sheet-shaped pulp into aqueous NaOH solution | 1.90 | 0.25 | 9100 | 16 | 3200 |
| Comp. Ex. 8 | 0.50 | immersion of chip-shaped pulp into aqueous NaOH solution | 1.90 | 0.25 | 9000 | 18 | 3400 |

The invention claimed is:

1. A method for producing a hydroxyalkyl alkyl cellulose comprising steps of:
   bringing sheet-shaped pulp having a pore volume of 0.55 ml/g or more and less than 1.00 ml/g or chip-shaped pulp obtained by cutting the sheet-shaped pulp into contact with a first alkali metal hydroxide solution to obtain an alkali cellulose mixture;
   removing a liquid from the alkali cellulose mixture to obtain alkali cellulose;
   reacting the alkali cellulose with an alkylating agent and a hydroxyalkylating agent to obtain a first reaction mixture;
   mixing the first reaction mixture with a second alkali metal hydroxide solution to obtain a second reaction mixture;
   purifying the second reaction mixture to obtain a hydroxyalkyl alkyl cellulose.

2. The method for producing a hydroxyalkyl alkyl cellulose according to claim 1, wherein the sheet-shaped pulp has a density of from 0.55 to 0.80 g/ml.

3. The method for producing a hydroxyalkyl alkyl cellulose according to claim 1, wherein the sheet-shaped pulp has an intrinsic viscosity of 3.0 to 15.0 dl/g.

4. The method for producing a hydroxyalkyl alkyl cellulose according to claim 1, wherein the step of mixing the first reaction mixture with a second alkali metal hydroxide solution comprises subjecting the first reaction mixture to addition of the second alkali metal hydroxide solution, and a temperature of the first reaction mixture is increased from the start to the end of the addition of the second alkali metal hydroxide solution.

5. The method for producing a hydroxyalkyl alkyl cellulose according to claim 4, wherein the temperature of the first reaction mixture is increased at a rate of from 10.0 to 30.0° C./hr.

6. The method for producing a hydroxyalkyl alkyl cellulose according to claim 4, wherein a rate of the addition of a second alkali metal hydroxide in the second alkali metal hydroxide solution is from 2.76 to 7.50 mol/mol·hr, expressed as the moles of the second alkali metal hydroxide added per mole of anhydroglucose unit of the sheet-shaped or chip-shaped pulp and per hour.

7. The method for producing a hydroxyalkyl alkyl cellulose according to claim 2, wherein the sheet-shaped pulp has an intrinsic viscosity of 3.0 to 15.0 dl/g.

8. The method for producing a hydroxyalkyl alkyl cellulose according to claim 7, wherein the step of mixing the first reaction mixture with a second alkali metal hydroxide solution comprises subjecting the first reaction mixture to addition of the second alkali metal hydroxide solution, and a temperature of the first reaction mixture is increased from the start to the end of the addition of the second alkali metal hydroxide solution.

9. The method for producing a hydroxyalkyl alkyl cellulose according to claim 8, wherein the temperature of the first reaction mixture is increased at a rate of from 10.0 to 30.0° C./hr.

10. The method for producing a hydroxyalkyl alkyl cellulose according to claim 8, wherein a rate of the addition of a second alkali metal hydroxide in the second alkali metal hydroxide solution is from 2.76 to 7.50 mol/mol·hr, expressed as the moles of the second alkali metal hydroxide added per mole of anhydroglucose unit of the sheet-shaped or chip-shaped pulp and per hour.

11. The method for producing a hydroxyalkyl alkyl cellulose according to claim 9, wherein a rate of the addition of a second alkali metal hydroxide in the second alkali metal hydroxide solution is from 2.76 to 7.50 mol/mol·hr, expressed as the moles of the second alkali metal hydroxide added per mole of anhydroglucose unit of the sheet-shaped or chip-shaped pulp and per hour.

12. The method for producing a hydroxyalkyl alkyl cellulose according to claim 2, wherein the step of mixing the first reaction mixture with a second alkali metal hydroxide solution comprises subjecting the first reaction mixture to addition of the second alkali metal hydroxide solution, and a temperature of the first reaction mixture is increased from the start to the end of the addition of the second alkali metal hydroxide solution.

13. The method for producing a hydroxyalkyl alkyl cellulose according to claim 12, wherein the temperature of the first reaction mixture is increased at a rate of from 10.0 to 30.0° C./hr.

14. The method for producing a hydroxyalkyl alkyl cellulose according to claim 12, wherein a rate of the addition of a second alkali metal hydroxide in the second alkali metal hydroxide solution is from 2.76 to 7.50 mol/mol·hr, expressed as the moles of the second alkali metal hydroxide added per mole of anhydroglucose unit of the sheet-shaped or chip-shaped pulp and per hour.

15. The method for producing a hydroxyalkyl alkyl cellulose according to claim 13, wherein a rate of the addition of a second alkali metal hydroxide in the second alkali metal hydroxide solution is from 2.76 to 7.50 mol/mol·hr, expressed as the moles of the second alkali metal hydroxide added per mole of anhydroglucose unit of the sheet-shaped or chip-shaped pulp and per hour.

16. The method for producing a hydroxyalkyl alkyl cellulose according to claim 3, wherein the step of mixing the first reaction mixture with a second alkali metal hydroxide solution comprises subjecting the first reaction mixture to addition of the second alkali metal hydroxide solution, and a temperature of the first reaction mixture is increased from the start to the end of the addition of the second alkali metal hydroxide solution.

17. The method for producing a hydroxyalkyl alkyl cellulose according to claim 16, wherein the temperature of the first reaction mixture is increased at a rate of from 10.0 to 30.0° C./hr.

18. The method for producing a hydroxyalkyl alkyl cellulose according to claim 16, wherein a rate of the addition of a second alkali metal hydroxide in the second alkali metal hydroxide solution is from 2.76 to 7.50 mol/mol·hr, expressed as the moles of the second alkali metal hydroxide added per mole of anhydroglucose unit of the sheet-shaped or chip-shaped pulp and per hour.

19. The method for producing a hydroxyalkyl alkyl cellulose according to claim 17, wherein a rate of the addition of a second alkali metal hydroxide in the second alkali metal hydroxide solution is from 2.76 to 7.50 mol/mol·hr, expressed as the moles of the second alkali metal hydroxide added per mole of anhydroglucose unit of the sheet-shaped or chip-shaped pulp and per hour.

* * * * *